United States Patent [19]

Lederman

[11] Patent Number: 4,925,323
[45] Date of Patent: May 15, 1990

[54] UNITIZED SEALED THRUST BEARING ASSEMBLY

[75] Inventor: Frederick E. Lederman, Sandusky, Ohio

[73] Assignee: General Motors Corporation, Detroit, Mich.

[21] Appl. No.: 397,203

[22] Filed: Aug. 23, 1989

[51] Int. Cl.⁵ .................. F16C 19/10; F16C 33/76
[52] U.S. Cl. ..................... 384/607; 384/617
[58] Field of Search ............ 384/607, 609, 611, 617

[56] References Cited

U.S. PATENT DOCUMENTS 4,120,543 10/1978 Greene, Jr. et al. ............ 384/607
4,362,344 12/1982 Lederman .................. 308/187.1
4,400,041 8/1983 Lederman ...................... 308/219
4,462,608 7/1984 Lederman ...................... 280/668
4,541,744 9/1985 Lederman ...................... 384/607
4,566,812 1/1986 Takei et al. ................ 384/607 X
4,722,616 2/1988 Lederman ...................... 384/482

Primary Examiner—Thomas R. Hannon
Attorney, Agent, or Firm—Patrick M. Griffin

[57] ABSTRACT

Instead of directly injection molding a layer of sealing elastomer to the outside of a metal bearing race, a separately molded sealing member is provided with a design that allows it to be bypass molded with access windows, yet still provide complete sealing.

2 Claims, 2 Drawing Sheets

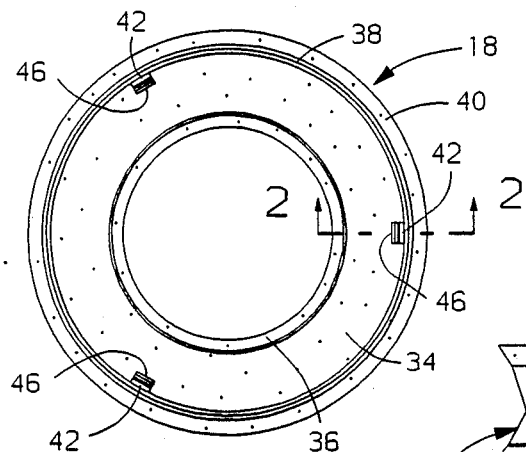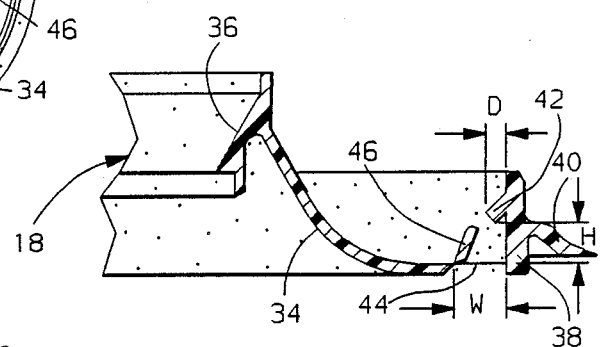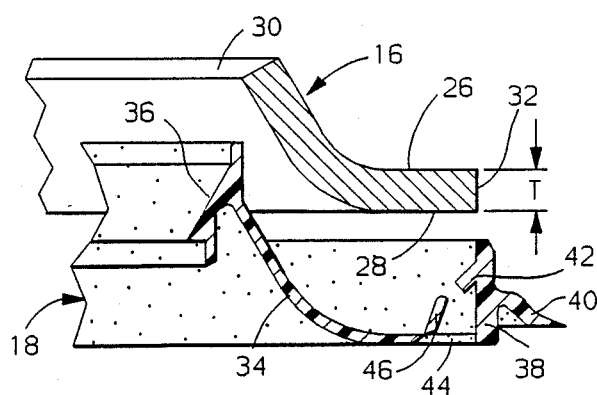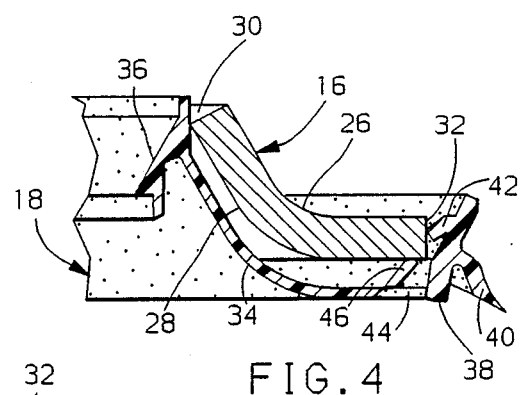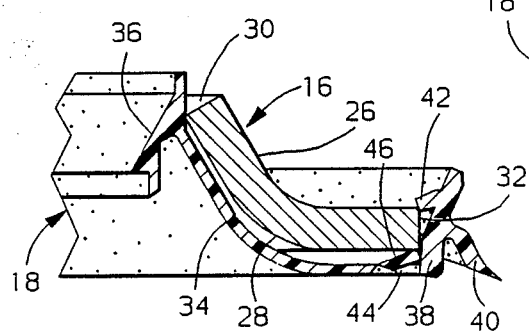

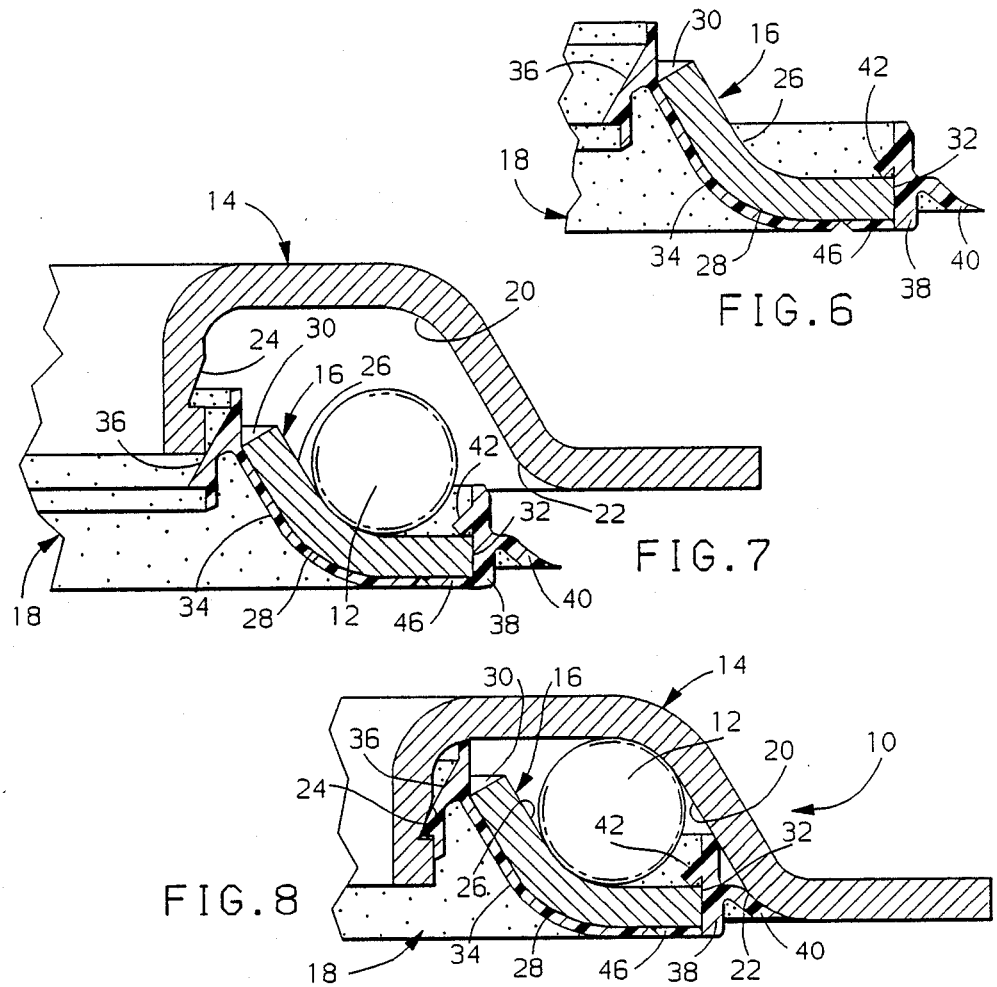
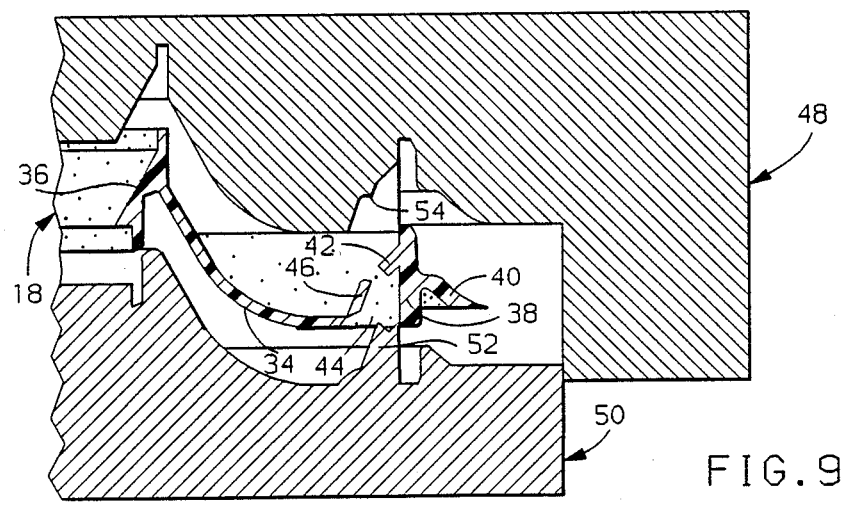
FIG. 6
FIG. 7
FIG. 8
FIG. 9

UNITIZED SEALED THRUST BEARING ASSEMBLY

This invention relates to unitized sealed thrust bearing assemblies in general, and specifically to such a bearing assembly in which a sealing member that forms a skin over the outer surface of one of the races may be molded as a separate component, rather than being molded directly to the race.

BACKGROUND OF THE INVENTION

The thrust ball bearing assemblies used in steerable vehicle suspension struts have fairly rigorous sealing requirements, because of the harsh environment to which they are exposed. It is also a great advantage in handling if such bearing assemblies are unitized, that is, if all the components are somehow retained together as a unitary assembly prior to installation to the vehicle. Several patents assigned to the assignee of the present invention disclose bearings in which the rigorous sealing and unitization features are combined in a simple structure.

One of the most simple is that disclosed in U.S. Pat. No. 4,400,041 to Lederman. An upper and lower metal race are stamped in a curvilinear shape that creates a pair of angular contact ball pathways, but which also leaves a pair of curved outer surfaces that need to be enclosed and sealed from the environment. The upper race is pushed into a concavity in an elastomer when it is installed, which also seals it. To seal the lower race, a continuous layer of elastomer is injection molded over its entire outer surface. The molded elastomer layer also forms a pair of sealing lips at the edges which engage the upper race to seal in the ball complement. One of the lips snap fits into a groove in the upper race to retain the races together, as well. While this design provides unitization, complete sealing, and a small number of components, a drawback is the cost of injection molding the elastomer layer to the lower race. The lower race must be carefully clamped and held in the mold to block elastomer from getting onto the ball pathway, which can be difficult if there is any variation in the race surfaces. It is much easier to mold an elastomer part as a separate piece, as opposed to molding it directly to a metal part. However, the least expensive means of molding a plastic part, called bypass molding, requires access windows through the part in order to mold surfaces that would otherwise radially overlap, like latches. These access windows would prevent complete sealing.

SUMMARY OF THE INVENTION

The bearing assembly of the invention provides a novel sealing member that can be bypass molded as a separate component, yet still give complete sealing.

In the preferred embodiment disclosed, the two races are essentially identical to those of the bearing assembly described above. The lower race is stamped from flat steel stock, with a curved inner pathway, a matching outer surface, and inner and outer terminal edges. The outer terminal edge is cylindrical, with a thickness equal to the stock from which the race was stamped. While the lower race pathway confronts the upper race, and is thereby protected from the environment, the terminal edges and outer surface would otherwise be exposed, and must be sealed and protected.

A separate sealing member is designed to cover all the exposed lower race surfaces, as well as to retain the races together. It also retains itself to the lower race as a subassembly. The sealing member is integrally molded from a tough elastomer, with a central skin that matches the shape of the outer surface of the lower race. The central skin is bordered by an inner sealing lip and an outer cylindrical wall. The inner sealing lip fits closely over the inner edge of the lower race, and the cylindrical wall fits closely over the lower race outer edge, but neither alone acts to retain the sealing member to the lower race. To provide retention, a series of evenly spaced flexible latching fingers extend in and down from the cylindrical wall, at a height above the skin about equal to the edge thickness of the lower race. Each latching finger extends inwardly by a latching distance that is far enough to overlay the inner surface of the lower race, but which is less than the height of the latching finger. Below each latching finger, a molding access window opens through the skin, which gives access to the mold element that forms the underside of the latching finger.

The access window would normally prevent the skin from being able to completely seal the lower race. However, a same size closing flap is integrally molded to each window. The flap extends up toward the latching finger, at a slight angle from the vertical, but can end short of the latching finger, since the window width is deliberately made less than the finger height. Thus, the flap can be bypass molded, as well. When the lower race is pushed axially down against the sealing member, its outer edge snaps past the latching fingers, which move over the lower race upper surface to retain the sealing member to the lower race as a subassembly. Simultaneously, the flaps are pushed down tight into their respective molding access windows. Lower race is thus completely sealed and enclosed. The ball complement and upper race can then be added to complete the assembly.

It is, therefore, an object of the invention to provide a sealing member that can seal a lower race with the same integrity as a layer of injection molded elastomer, but which can be bypass molded as a separate component.

It is another object of the invention to provide such a sealing member through the use of race engaging latching members aligned with molding access windows that have integrally molded closing flaps.

It is another object of the invention to provide such a sealing member by controlling the relative height and width of the latching finger so that the molding access window for the latching finger can be provided with a properly sized and easily closed flap.

DESCRIPTION OF THE PREFERRED EMBODIMENT

These and other objects and features of the invention will appear from the following written description, and from the drawings, in which:

FIG. 1 is a plan view of a preferred embodiment of the sealing member of the invention;

FIG. 2 is a cross sectional view taken along the line 2—2 of FIG. 1;

FIG. 3 is a view like 2, but showing the lower race coaxially aligned with the sealing member, prior to installation;

FIG. 4 shows the sealing member being added to the lower race;

FIG. 5 is like 4, but farther along in the process;

FIG. 6 shows the completed subassembly of lower race and sealing member;

FIG. 7 shows the upper race just before it is added to the subassembly;

FIG. 8 shows the completed bearing assembly;

FIG. 9 shows a cross section through the mold halves that mold the sealing member.

Referring first to FIGS. 3, 7 and 8, a preferred embodiment of a thrust ball bearing assembly incorporating the invention is indicated generally at 10. Bearing 10 has three basic components, apart from a complement of bearing balls 12. These three are an upper race, indicated generally at 14, a lower race, indicated generally at 16, and a sealing member, indicated generally at 18. Each race, 14 and 16, is stamped from an annular blank of flat bearing steel stock in a curvilinear shape, that is, in a shape that will present an angular contact pathway to the ball complement 12. Upper race 14 may be described briefly, as it is identical to that described in U.S. Pat. No. 4,400,041. Upper race 14 has a central angular contact pathway 20 bordered by an outer sealing surface 22 and a conical sealing groove 24. Since upper race 14 is adapted to fit tightly into an elastomer suspension mount, it will be substantially sealed and covered from the environment. Lower race 16, like upper race 14, is identical to that disclosed in the patent above. It is also stamped out of an annular blank of flat stock, in a simple shallow curve. An inner surface pathway 26 is matched by a parallel outer surface 28, with an inner terminal edge 30 and outer terminal edge 32. Outer edge 32 is not deformed appreciably when the blank is stamped, and so is basically vertical and cylindrical, with a thickness T equal to the thickness of the stock from which it was stamped. The pathway 26 does not face the environment, but all the other surfaces of lower race 16 would be exposed, without a cover or seal.

Referring next to FIGS. 1 and 2, sealing member 18 is integrally molded in one piece of a suitable polyester thermoplastic elastomer, or the like, which is tough and resilient, and has good creep resistance and low temperature flexibility. Sealing member 18 has a central, relatively thin conforming skin 34 with a shape that matches the lower race outer surface 28. The skin 34 is bordered on the inside by a conical sealing lip 36, which has an outside diameter that fits freely over the lower race inner edge 30 and which also snap fits into upper race sealing grove 24. Skin 34 is bordered on the outside by a cylindrical wall 38, which has the same inner diameter as lower race outer edge 32. An annular sealing flange 40 extends radially outwardly from wall 38. If sealing member 18 could be retained tightly to lower race 16, skin 34 would cover its outer surface 28, sealing lip 36 would cover its inner edge 30, and outer wall 38 would cover its outer edge 32. However, sealing lip 36 and wall 38 fit closely, but freely, over the lower race edges 30 and 32, not tightly enough to retain sealing member 18 to lower race 16. The retention function is provided by other structure, described next.

Referring next to FIG. 2, a series of three evenly spaced latching fingers 42 are molded integrally to wall 38. Each finger 42 slopes axially down from wall 38 to a height H, measured above skin 34, that is just less than the thickness T. Each finger 42 also extends radially inwardly from wall 38 an effective distance D. D, which may be conveniently referred to as the latching distance, is sufficient that finger 42 would substantially overlap the lower race pathway 26 if the lower race outer edge 32 were abutted with the sealing member wall 38. However, D is deliberately made significantly less than H, for reasons described below. Directly axially below each finger 42 is a molding access window 44 that opens through skin 34. Each window 44 has a radial width W, measured radially inwardly in from wall 38, that is at least equal to, and here slightly more than, the latching distance D. Integrally molded at a live hinge to the radially inner edge of each window 44 is a closing flap 46 that has the same shape and width as its window 44. Therefore, since W is close to D, and D significantly less than H, flap 46 terminates short of the end of finger 42, which is important to the molding process, described next. Also, flap 46 extends up toward the end of finger 42 at a slight angle, not vertically, and so overhangs its window 44, to an extent. This aids in assembly, discussed last.

Referring next to FIG. 9, further insight into the design of sealing member 18 may be gained by considering the way in which it is molded. Sealing member 18 is bypass molded, that is, it is molded by a single pair of mold halves that close and part along a straight line, with no inserts or slides. These are an upper and lower mold half, indicated generally at 48 and 50. All the surfaces of skin 34, inner lip 36, outer wall 38 and flange 40 have no undercuts relative to the axis of sealing member 18, and are therefore suitable for bypass molding. The latching fingers 42, however, would have an undercut, that is, they would radially overlap the skin 34, were it not for the access windows 44. Each access window 44 allows a respective projection on the lower mold half 50, indicated at 52, to come up through skin 34, form the underside of latching finger 42 as well as the underside of the attendant closing flap 46. Projection 52 is then withdrawn through window 44 when the mold halves 48 and 50 again part. But, without more, the access windows 44 would disturb the sealing integrity of skin 34. Each closing flap 46, since it terminates short of the end of a respective latching finger 42, leaves a gap. Therefore, a projection 54 on the upper mold half 48 may come down through the gap between the flap 46 and finger 42 to pinch off against the top of the lower mold half 50 projection 52 and form the upper surface of the finger 42 and flap 46. The particular configuration and relative orientation of flap 46 and finger 42 also gives sealing integrity when the assembly 10 is put together, as described next.

Referring next to FIGS. 3 through 8, the various steps in the assembly process are illustrated. Lower race 16 is first coaxially aligned with sealing member 18, FIG. 3. Then, lower race 16 is moved straight down, which pushes its outer edge 32 past the flexible fingers 42, bulging wall 38 out, while its outer surface 28 begins to engage the flaps 46, FIG. 4. As lower race 16 is pushed farther down, the flaps 46 are pushed down toward their respective access windows 44, as the fingers 42 begin to snap back in, FIG. 5. Finally, as shown in FIG. 6, the fingers 42 snap back into their original position, contacting the lower race inner surface 26 with a slight tension. Sealing member 18 is thereby fully retained to lower race 16 as a subassembly. The wall 38 is closely abutted with the lower race outer edge 32, inner lip 36 covers the inner edge 30, and the skin 34 is held in close conformity with the outer surface 28. Each flap 46 is pushed tightly into an access window 44, filling it up, so the seal of all the otherwise exposed surfaces of sealing member 18 is complete. Then, the ball complement 12 is added, and upper race 14 is moved straight down toward lower race 16, FIG. 7. Finally, pathway 20 contacts balls 12, outer sealing flange contacts outer sealing surface 22, and inner sealing lip 36 snaps into inner sealing groove 24 simultaneously, FIG. 8. Bearing assembly 10 is complete, and is the functional equivalent of that disclosed in the patent above.

Variations of the preferred embodiment may be made. For example, the closing 46 flaps could be oriented basically vertical, rather than sloped as shown, and still be moldable. However, the slight tip toward the windows 44 helps assure that they will move in the right direction when engaged by the lower race 16. If the lower race inner edge were more horizontal than edge 30 is, then it is conceivable that latching fingers like 42 could be molded in off of the inside of the inner lip 36, and snapped over the more horizontal lower race inner edge. Therefore, it will be understood that it is not intended to limit the invention to just the embodiment disclosed.

The embodiments of the invention in which an exclusive property or privilege is claimed are defined as follows:

1. A unitized, sealed thrust ball bearing assembly, comprising,
    a first curvilinear race having a ball pathway bordered by inner and outer sealing surfaces,
    a second curvilinear race having an inner surface defining a ball pathway disposable in confronting relation to said first race pathway, an outer surface, and at least one generally cylindrical terminal edge having a predetermined thickness and joining said inner and outer surfaces that is disposed substantially vertically when said pathways confront one another, and,
    a molded sealing member having a skin conformable to said second race outer surface and a generally cylindrical bordering wall molded integrally with said skin,
    at least one flexible latching finger molded integrally to said bordering wall at a height above said skin approximately equal to said predetermined edge thickness and extending inwardly therefrom by a latching distance that is substantially less than said height, but sufficient to overlay said second race inner surface when said second race outer surface is conformed to said sealing member skin,
    a molding access window opening through said skin below said latching finger and having a width measured from said bordering wall that is slightly more than said latching distance, and,
    a closing flap integrally molded to said access window having substantially the same size and shape as said window, said closing flap extending up toward said latching finger but terminating short of said latching finger, by virtue of said window width being less than said finger height,
    whereby, as said second race is moved toward said sealing member to bring its outer surface into conforming engagement with said skin, said second race terminal edge moves along said bordering wall and snaps past said latching finger as it simultaneously pushes said closing flap into said molding access window, thereby retaining said sealing member to said second race and completely enclosing said second race.

2. A unitized, sealed thrust ball bearing assembly, comprising,
    an upper curvilinear race having a ball pathway bordered by inner and outer sealing surfaces,
    a lower curvilinear race having an inner surface defining a ball pathway disposable in confronting relation to said upper race pathway, an outer surface, and an outer cylindrical terminal edge having a predetermined thickness and joining said inner and outer surfaces that is disposed substantially vertically when said pathways confront one another, and,
    a molded sealing member having a skin conformable to said lower race outer surface and an outer cylindrical wall molded integrally with said skin,
    at least one flexible latching finger molded integrally to said wall at a height above said skin approximately equal to said predetermined edge thickness and extending radially inwardly therefrom by a latching distance that is substantially less than said height, but sufficient to overlay said lower race inner surface when said lower race outer surface is conformed to said sealing member skin,
    a molding access window opening through said skin below said latching finger and having a width measured from said bordering wall that is slightly more than said latching distance, and,
    a closing flap having substantially the same size and shape as said window and integrally molded to said window inner edge, said closing flap extending axially upwardly and radially outwardly at a slight angle up toward said latching finger so as to partially overlay said window, but terminating short of said latching finger, by virtue of said window width being less than said finger height,
    whereby, as said lower race is moved toward said sealing member to bring its outer surface into conforming engagement with said skin, said lower race terminal edge moves along said wall and snaps past said latching finger as it simultaneously pushes said closing flap farther toward and into said molding access window, thereby retaining said sealing member to said lower race and completely enclosing said lower race.

* * * * *